(12) United States Patent
Louhivuori et al.

(10) Patent No.: US 9,905,207 B2
(45) Date of Patent: Feb. 27, 2018

(54) DEVICE AND A SYSTEM FOR PRODUCING MUSICAL DATA

(71) Applicant: TACTION ENTERPRISES INC., Beverly Hills, CA (US)

(72) Inventors: Jukka Louhivuori, Jyväskylä (FI); Esa Viirret, Jyväskylä (FI)

(73) Assignee: TACTION ENTERPRISES INC., Beverly Hills, CA (US)

( * ) Notice: Subject to any disclaimer, the term of this patent is extended or adjusted under 35 U.S.C. 154(b) by 0 days.

(21) Appl. No.: 15/649,598

(22) Filed: Jul. 13, 2017

(65) Prior Publication Data

US 2017/0316765 A1    Nov. 2, 2017

Related U.S. Application Data

(63) Continuation-in-part of application No. PCT/FI2015/050962, filed on Dec. 31, 2015.

(30) Foreign Application Priority Data

Jan. 14, 2015   (FI) ...................................... 20155025

(51) Int. Cl.
*G10H 1/00* (2006.01)
*G10H 1/32* (2006.01)
(Continued)

(52) U.S. Cl.
CPC ........... *G10H 1/0008* (2013.01); *G06F 3/014* (2013.01); *G06F 3/0202* (2013.01); *G10H 1/32* (2013.01);
(Continued)

(58) Field of Classification Search
CPC ........ G10H 1/0008; G10H 1/32; G10H 1/365; G10H 2220/326; G06F 3/014; G06F 3/0202; H04M 1/7253
(Continued)

(56) References Cited

U.S. PATENT DOCUMENTS 2,780,954 A * 2/1957 Bryce ...................... G10D 7/12
                                                              2/160
3,027,794 A * 4/1962 Chute .................... G10D 13/08
                                                              116/170
(Continued)

FOREIGN PATENT DOCUMENTS

CN       202373287 U     8/2012
EP       2061027 A2 *    5/2009   ............... G10H 1/24
(Continued)

OTHER PUBLICATIONS

International Search Report for PCT/FI2015/050962, dated Apr. 22, 2016.
(Continued)

*Primary Examiner* — David Warren
*Assistant Examiner* — Christina Schreiber
(74) *Attorney, Agent, or Firm* — FisherBroyles, LLP; Robert Kinberg

(57) ABSTRACT

The invention relates to a device for producing musical data, which includes a glove equipped with touch sensors and a terminal device. In the glove there are touch sensors in at least two rows the format of a selected musical scale, which touch sensors are arranged to be pushed with a finger of the other hand, connection means for connecting the touch sensors to a selected terminal device in order to produce musical data according to the format. The touch sensors are arranged in such a way that in an order from the index finger to the little finger, the tips of the fingers correspond to the consecutive notes of a first octave C, D, E, F, so that the semitone E-F is located between the ring finger and the little finger.

12 Claims, 6 Drawing Sheets

(51) Int. Cl.
*G10H 1/36* (2006.01)
*G06F 3/01* (2006.01)
*G06F 3/02* (2006.01)
*H04M 1/725* (2006.01)

(52) U.S. Cl.
CPC ....... *G10H 1/365* (2013.01); *G10H 2220/326* (2013.01); *H04M 1/7253* (2013.01)

(58) Field of Classification Search
USPC .......................................................... 84/644
See application file for complete search history.

(56) References Cited

U.S. PATENT DOCUMENTS

| | | | | |
|---|---|---|---|---|
| 4,414,537 A | * | 11/1983 | Grimes | A61B 5/1114 341/20 |
| 4,635,516 A | * | 1/1987 | Giannini | G10H 1/32 2/160 |
| 4,681,012 A | * | 7/1987 | Stelma | G10D 13/06 2/160 |
| 5,029,508 A | * | 7/1991 | Suzuki | G10H 1/34 84/616 |
| 5,119,709 A | * | 6/1992 | Suzuki | G10H 1/053 84/600 |
| 5,151,553 A | * | 9/1992 | Suzuki | G10H 1/0558 341/20 |
| 5,338,891 A | * | 8/1994 | Masubuchi | G10H 1/0558 84/600 |
| 5,512,703 A | * | 4/1996 | Usa | G10H 1/0558 84/600 |
| 5,571,020 A | * | 11/1996 | Troudet | G09B 5/065 2/160 |
| 6,112,330 A | * | 9/2000 | Bryan | A41D 19/0031 116/137 R |
| 6,734,349 B1 | * | 5/2004 | Adams | G10D 13/003 84/315 |
| 7,012,593 B2 | * | 3/2006 | Yoon | G06F 3/014 340/407.1 |
| 7,381,881 B1 | | 6/2008 | Sapp | |
| 7,381,884 B1 | * | 6/2008 | Atakhanian | G10H 1/34 84/477 R |
| 7,674,969 B2 | * | 3/2010 | Xu | G10H 1/24 84/615 |
| 7,798,956 B2 | | 9/2010 | Bob et al. | |
| 7,842,879 B1 | * | 11/2010 | Carter | G10H 3/143 84/600 |
| 2009/0126554 A1 | * | 5/2009 | Xu | G10H 1/24 84/610 |
| 2011/0132181 A1 | * | 6/2011 | Kockovic | G10H 1/34 84/723 |
| 2015/0317910 A1 | * | 11/2015 | Daniels | G09B 19/003 84/485 R |
| 2016/0224112 A1 | * | 8/2016 | Imada | G06F 3/014 |
| 2017/0262060 A1 | * | 9/2017 | Katsuki | G06F 3/016 |
| 2017/0316765 A1 | * | 11/2017 | Louhivuori | G10H 1/0008 |

FOREIGN PATENT DOCUMENTS

| | | | | |
|---|---|---|---|---|
| GB | 2 231 191 A | | 11/1990 | |
| GB | 2231191 A | * | 11/1990 | ............... G10H 1/34 |
| JP | S48-11998 U | | 2/1973 | |
| JP | 11003081 A | * | 1/1999 | ......... A41D 19/0024 |
| JP | 11015469 A | * | 1/1999 | ......... A41D 19/0024 |
| JP | H11-15469 A | | 1/1999 | |
| WO | 2007/076592 A1 | | 7/2007 | |
| WO | WO 2007076592 A1 | * | 7/2007 | ............. G06F 3/014 |

OTHER PUBLICATIONS

Written Opinion for PCT/FI2015/050962, dated Apr. 22, 2016.
MPR121 Proximity Capacitive Touch Sensor Controller, Technical Data, Freescale Semiconductor, Sep. 2010.

* cited by examiner

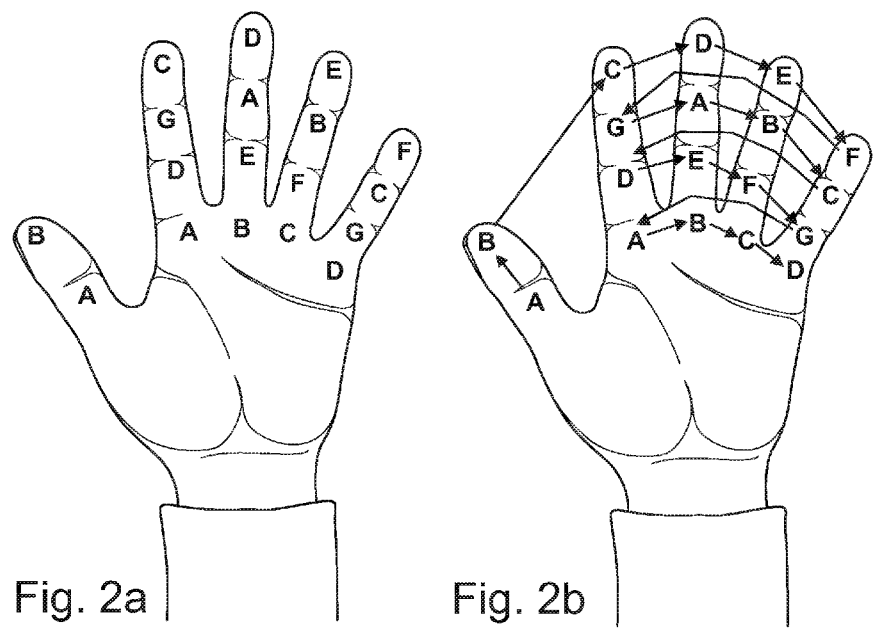
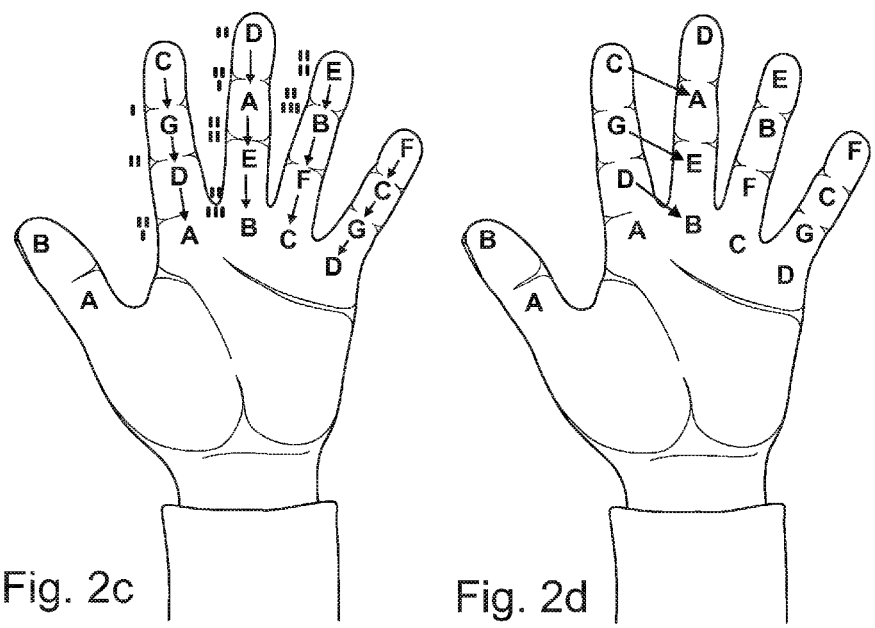

DEVICE AND A SYSTEM FOR PRODUCING MUSICAL DATA

CROSS-REFERENCE TO RELATED APPLICATIONS

This application is a continuation-in-part of International Patent Application No. PCT/FI2015/050962, filed Dec. 31, 2015, designating the United States, and claiming benefit of Finland Patent Application No. 20155025, filed Jan. 14, 2015, the disclosures of which are incorporated herein by reference in their entirety.

FIELD OF THE INVENTION

The invention relates to a device and a system for producing musical data, wherein the device includes a glove equipped with touch sensors and a terminal device, and in which glove there are touch sensors in at least two rows in the format of selected musical scale, which touch sensors are arranged to be pressed with the fingers of the other hand, connection means for connecting the touch sensors to the selected terminal device, in order to produce tone data according to the said format.

There is also presented a system comprising a full set of devices to play and utilize music data.

BACKGROUND OF THE INVENTION

At the present moment, the instruments available to teachers are not the best possible means for teaching the theory of music, because many of the basic concepts of music cannot be easily illustrated with their aid. Such are the position of semitones in the structures of the various scales, the circle of fifths, the position of key signatures, etc. The volume of the note produced is also of central importance in the teaching of music.

Guido of Arezzo was a musical theoretician and pedagogue who lived in Italy in the Middle Ages (about 990-1030). He utilized the human hand to illustrate basic concepts of musical theory and theoretical systems that are difficult to grasp. In Guido's hand, the notes of a scale are projected onto the structure of the fingers.

It is not worth adapting Guido of Arezzo's system as such to the present-day teaching of musical theory, for, among other reasons, in the Middle Ages the so-called hexachord system was used in place of the present-day note system (with six notes in the scale instead of the present seven notes).

U.S. Pat. No. 7,381,884 B1 discloses a glove, in which sensors in the thumb and other fingers are arranged to produce tone signals. The sensors are at the tips and joints of the fingers, as well as in the area of the palm. The sensors detect both contact and joint angle, thus allowing the production of a great number of different notes. The strength and duration of the contact are registered digitally. The more detailed technology of the sensors is not disclosed.

U.S. Pat. No. 7,842,879 B1 discloses a glove, in which there are contact-sensitive sensors particularly at the finger tips, for example, piezo-electrodes, for producing signals by pressing the tip of the finger against a base.

Japanese application publication JP 11-15469 discloses several different sensor assemblies fitted to a glove, combined with a sound generator. Gloves according to the publication are used to stimulate the activity of the fingers when rehabilitating a patient. In several models, the thumb is pressed against some other selected finger. In the glove of FIG. 2, there are also touch sensors on the knuckle side, which are operated by the fingers of the other hand.

The electronic recording of conventional music is based on so-called MIDI coding, when the information of a composition can be recorded in a compressed form. Indeed, the concept MIDI refers to an interface and manner of coding between a musical device and a computer. Many electronic musical instruments produce MIDI data for further processing by a computer.

The known solutions described above are either not suitable at all, or poorly suited to teaching musical theory. The publications do not disclose a musical-scale format in a glove. There has been a demand for a glove application having an illustrative arrangement regarding music theory, particularly the notes of scale and optionally other features.

SUMMARY OF THE INVENTION

The present invention is intended to create a wearable control device, more specifically a glove equipped with touch sensors, by means of which the needs of teaching musical theory better can be met better than previously. The characteristic features of the invention are stated in the accompanying claim 1. In the glove according to the invention, there are touch sensors, operated by the fingers of the other hand, in at least two rows, in such a way that the semitones are arranged logically relative to the fingers, particularly on the outer edge. The format of the scale according to the invention in the glove allows a pedagogically effective way to teach and learn the 7-note scale and its various properties.

According to a preferred embodiment, the touch sensors are arranged in such a way that the tips of the fingers from the index finger (12.1) to the little finger correspond to the consecutive notes C, D, E, F of the first octave, so that the semitone E-F is located between the ring finger and the little finger. Further, the thumb preferably includes the touch sensors A and B, so that the semitone B-C is located between the thumb and index finger.

Here, the glove must be understood broadly. 'Glove' means any base whatever that visually recalls a glove, held on the first hand, which can be operated with the fingers of the second hand. The physical glove permits a playing feeling, based on the sense of touch, through both hands. Technically, the electric response in the touch sensors, caused by the finger ends of the second hand, is electrically different to the response created by a neutral base, such as a table, etc. The touch sensor can thus be "tuned" according to the fingertip.

Another embodiment broadens the concept of the same mapping of notes elsewhere in one hand, e.g. on a palm, while the mapping has same order, thus presenting virtually the fingers.

From the point of view of musical pedagogy, it is important that the touch-sensitive sensors are in some kind of a selected illustrative order. The connection of musical theory to the structure of the hand permits the illustrative teaching of basic concepts. With the aid of the glove according to the invention, the basic elements of Western musical theory can be connected to the joint structure of the hand. In a glove according to a preferred embodiment, each part of a finger (proximal phalanx, middle phalanx, distal phalanx) corresponds to a note of a scale. Touch sensors located in the relevant parts of the glove transmit the touch information to the central unit, in which a corresponding sound signal or other control signal, e.g., in MIDI format, is created.

Even the placement two rows of touch sensors in the glove is suitable for teaching scale structure, interval structure, and chord structure. A glove of at least three rows is already suitable for diverse playing and a more comprehensive teaching of musical theory. From the point of view of teaching musical theory, the semitone steps in a seven-step scale occur logically relative to the fingers.

For musicians the mapping of the notes is familiar especially from string instruments (violin, cello, bass, guitar etc.). From this perspective fingers represent "strings" (four/five strings). This makes the learning process easy and fast for musicians who are already familiar with moving from one string to another—in our case from one finger to another. The order of notes in the glove is not similar with traditional instruments, but the idea of moving from one string to another is what happens with existing string instruments. In the experiments with musicians we have found that it takes about 5 to 10 minutes for them to get the idea of mapping of the notes of the scales and to be able to play fluently with the glove.

The possibility to control dynamics of every note is important from musical point of view, because key notes of the scale (tonic, dominant etc.) are often separated from "unimportant" notes (for example auxiliary notes) by playing them more loudly. Important element in perception of a specific scale is dynamical differences between notes of the scale. Thus, the possibility to control dynamics by measuring capacitance changes is an important quality of the musical glove.

In another embodiment capacitive sensors with strength detection are used. When each base note may be played louder, learning of whole the 7-tone scale with semitones is easier. The strength of sound is important also in many other ways. Keeping motivation of a user requires more versatile device than capable playing monotone notes.

In another embodiment the sensors are attached to another garment virtually in same 7-tone order as defined above in fingers.

The glove includes an output connection for transferring the data signal created by a touch to a selected device. The selected device, particularly a musical device, to which the signal is led, can be integrated in the glove itself, or can be an external device, such as an external loudspeaker, headphones, a MIDI device, a PC, or a smart phone.

In one preferred embodiment, haptic feedback is connected to the touch sensors. In that case, the tip of the playing finger detects pressure.

In terms of playing sensation, the two-sidedness of the touch is also important. Both hands participate actively in producing and controlling the sound, so that the haptic feedback obtained from the touch is transmitted through the fingers of both hands. For example, a "heavy" touch producing a loud sound is felt as muscular tension and motion resistance in the fingers and muscles of both the glove hand and the hand without a glove.

From the point of view of musical theory, what is important is the sequence in which the sensors are placed on the glove and what note of the scale each sensor corresponds to. In the musical glove, the sensors are placed in a sequence, in which the most important, from the point of view of musical theory, whole tone and semitone steps are placed in an ideal location in terms of outlining the structures of musical scales: the placing of a semitone step between the shortest finger of the hand and the ring finger corresponds to the location of the semitone step in musical theory.

Each touch sensor preferably detects the strength of a push or a corresponding variable. This takes place most preferably with the aid of capacitive sensors, in which the magnitude of the push indicates the volume of the playing. The surface area of the push is detected through the magnitude of the capacitance. In other ways too it is clear a pedagogically good solution demands an appropriate technical solution, so as not to lose the benefits. Capacitive touch detection thus relates preferably to this pedagogical basic solution. Preferably the rate of change in capacitance is also detected and interpreted in a touch event.

Control buttons can be attached to the device, with the aid of which it is possible to transpose scales, change timbre (different instrument sounds), control the sound volume, etc.

The operation of the touch sensors of the device can be defined in many different ways. In addition to notes, each touch sensor can produce, for example, a chord corresponding to the key name in question, i.e. C=C major, G=G major, etc. The device can also be used for controlling other musical devices such as sequencers. Depending on the device being controlled and the software used, when pushing the touch sensors a music program can, for example, produce diverse accompaniment figures.

The touch sensors and the central unit controlling them can also be programmed in such a way that the glove can be used for other purposes too, such as, for example, the control of different sound parameters, the control of effect devices relating to performances, entering text and numbers in mobile devices, the control of other functionalities of mobile devices, or as a game controller.

BRIEF DESCRIPTION OF THE DRAWINGS

In the following, the invention is described with examples and reference to the accompanying figures, which show embodiments of the invention and its musical-pedagogical background.

FIGS. 2a-2e show the pedagogical background to the invention;

FIG. 2f shows the use of the glove as a control device;

DETAILED DESCRIPTION OF THE INVENTION

The interface of the control device according to the invention is preferably based on capacitive sensors. The bases of the technology are known and several practical implementations exist, which can be modified for this purpose.

A capacitive touch sensor is manufactured, for example, from a piece of fabric surfaced with an electrically conductive nanomaterial and a connection conductor connected to it. Such an arrangement can be glued to, or woven into the surface of the glove. The strength of a push can be detected through the surface area of the touch. A larger force creates a larger surface area and this in turn creates a larger capacitance.

In a galvanic touch sensor, two electrically conductive wires (not shown) are brought to the parts of the fingers between the tips and the joints (left hand). There is a corresponding glove on the user's right hand, the material of which is electrically conductive fabric. By using the glove on the right hand to touch the desired part (proximal, middle, distal phalanx) of the fingers of the left hand, the electrically conductive wires at the point of contact form current circuits, thus creating a signal.

Naturally, the operation of the hands can be implemented the other way around, in which case the interface will be in the right hand. Pedagogically this is not the best solution in cases in which the student otherwise reads from left to right.

Figure 1:
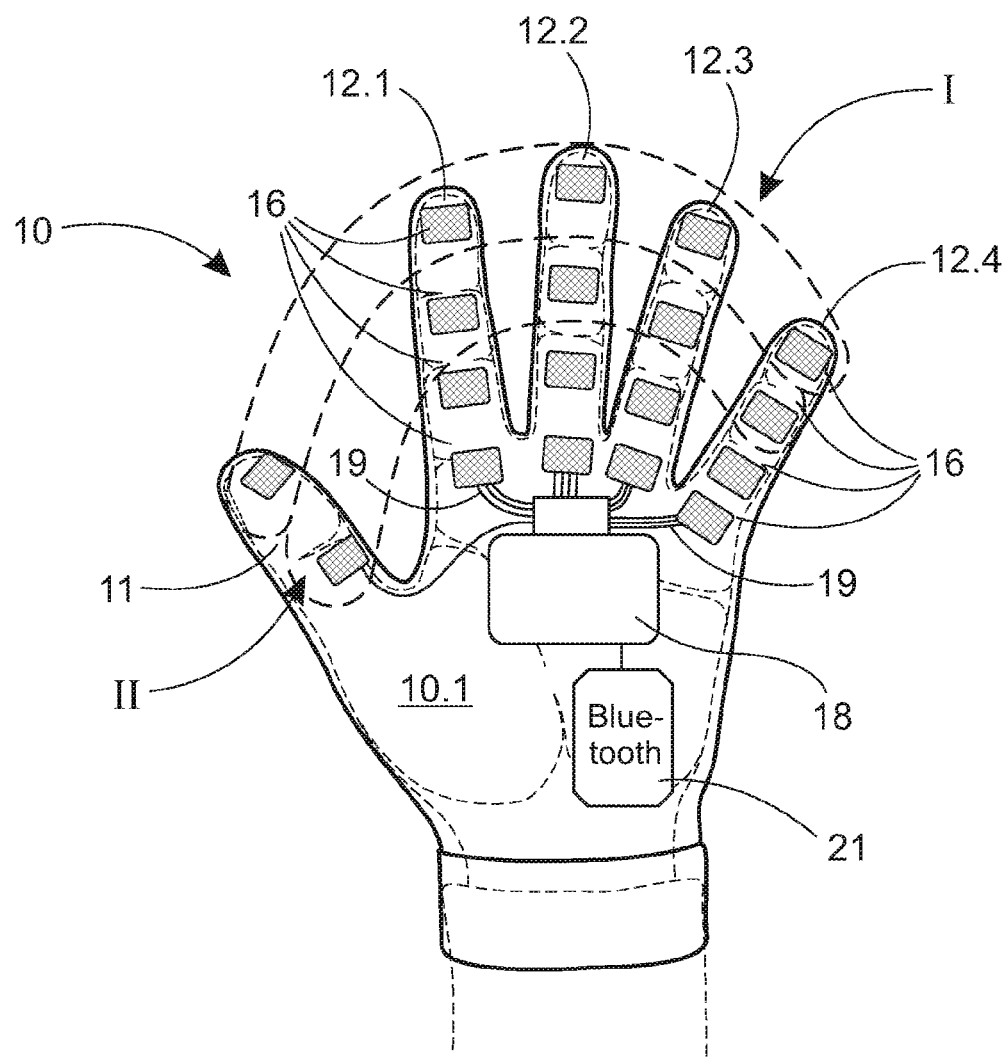
FIG. 1 shows one embodiment of the glove according to the invention.

The control device of FIG. 1 is constructed in connection with a suitable glove. As such, the glove 10 itself has no other use than to carry the electrical touch sensors 16 at selected places relative to the fingers and to connect the signal conductors of the touch sensors 16 to the central circuit 18, in which, for example, a MIDI encoder is used to produce digital playing data (shown in greater detail in FIG. 3).

In this embodiment, there are in the device 10 two touch sensors 16 in the thumb 11 of the glove 10.1 and four touch sensors 16 in each of the other fingers (12.1-12.4). These are arranged in such a way that at each point on top of the parts of the fingers (proximal, middle, and distal phalanx) there is a touch sensor 16, except on the thumb, where there are only the said two sensors.

The touch sensors are of some known type. The touch sensors can operate, for example, piezo-electrically, capacitively, inductively, resistively, or galvanically. The change is created by pushing with a finger of the other hand. A capacitive sensor is suitable because, among other things, the need for wiring is halved and, in addition to only information on touch, analog information can be obtained on, for instance, the strength and speed of the touch, based on the changing capacitance. In addition, it is electromechanically easy to implement a capacitive sensor in such a way as to integrate it inconspicuously in the structure of the glove 10.1. Capacitive detection is advantageous, because of the electrical response created by the fingertip. Stray capacitances are easily handled, when playing finger is "grounded" through the body of user to the glove hand.

FIGS. 2a-2e show examples of gloves according to the invention relative to central concepts of Western musical theory (scale structure, the location of semitones in a major scale, circle of fifths, intervals, key signatures, etc.). In the figures, the location of the touch sensors, i.e. their mapping (pattern) on the glove is illustrated precisely relative to the hand. Instead of absolute note names (c, d, e, etc.), it is also possible to use the relative note names (do, re, mi, etc.) used in ear training (Tonic Sol-fa and Kodály methods). In the figures, the notes are marked at the location of the different parts of the finger (proximal, middle, distal phalanx) as in Guido's hand.

FIG. 2a shows the basic structure of a glove according to the invention. With the aid of the arrangement, it is possible to produce a sound range of more than two octaves (from a small a note to a three-lined note).

FIG. 2b shows the progression of a scale with the aid of fingers. The arrows depict the location of the notes of the scale in the proximal, middle, and distal phalanxes of the fingers (a-b-c-d-e-f-g-a etc.).

Instead of the absolute names of the notes (C, D, etc.), relative names can be used (i.e. do, re, mi, fa, sol, la, ti).

FIG. 2c shows the utilization of the invention to teach a series of fifths. The arrows depict the location of the series of fifths relative to the parts of the finger (c-g-d-a; d-a-e-h etc.), as well as the number of sharps (G major=1#; D major=2# etc.).

Starting the scale from the first joint of the index finger, a major scale is created. Starting from the second, i.e. lower joint of the thumb, a minor scale is created. Starting from the first joints of the other fingers, the modes, i.e. the church keys are created.

In FIG. 2d, the arrows depict finding intervals with the aid of the parts of adjacent fingers (c-a and g-e: major sixth etc.).

Figures 2E, 2F:
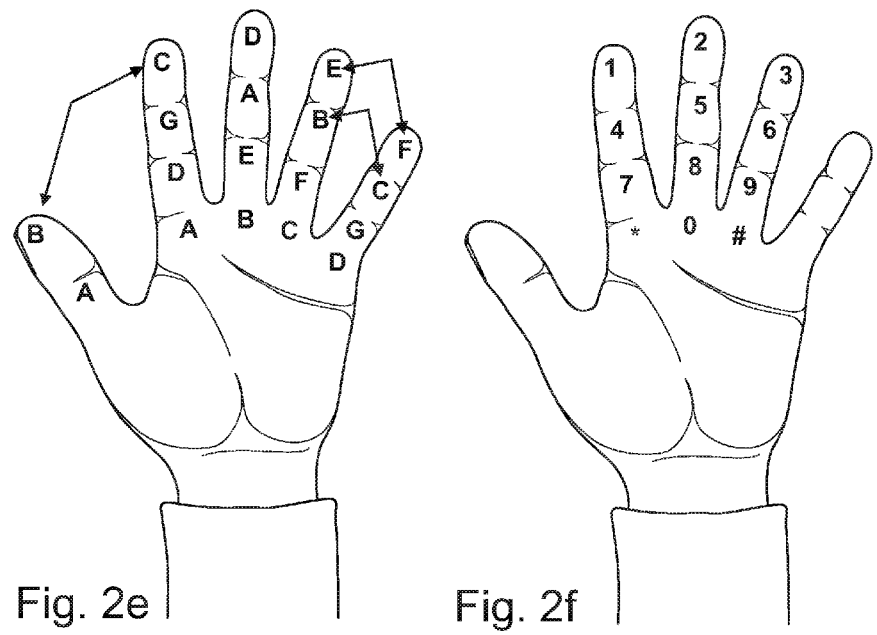

In FIG. 2e, the arrows depict the location of the semitones at the side of the palm (e-f; b-c etc.). The semitones are located in the area of the outermost fingers, preferably between the ring finger and the little finger and also between the thumb and index finger. The glove could be implemented without the latter, also by turning the notes of the index finger and the little finger the other way around, thus losing some of the pedagogical benefit. In addition, notes are preferably read in most countries from left to right, so that the glove being played is mainly in the left hand and is played with a finger of the right hand.

On the basis of the above examples, the control device according to the invention is suitable for the comprehensive teaching of modern musical theory.

In addition, the control device can be used for controlling different devices. FIG. 2f illustrates the placing of the numbers of a conventional telephone keypad relative to the parts of the fingers.

Figure 3:
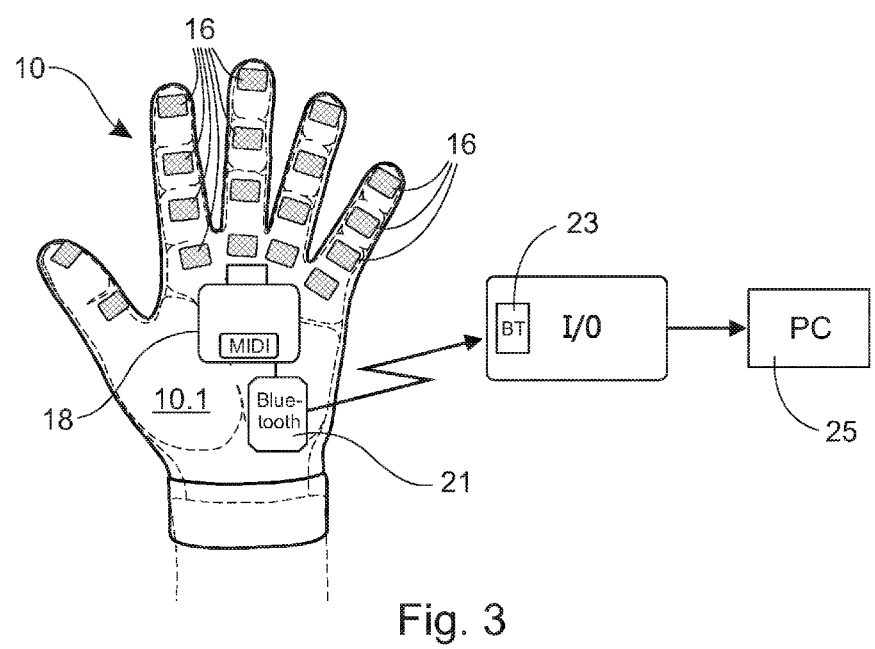
FIG. 3 shows one embodiment totality according to the invention.

FIG. 3 shows one preferred arrangement applying the invention in its totality. MIDI encoding takes place using the central circuit 18 of the glove. If a Bluetooth transmitter is used in the glove according to the invention, it will naturally give degrees of freedom to the user. Here, the Bluetooth circuit 21 transmits MIDI code to a Bluetooth receiver 23, which inputs the data in a conventional manner to a computer (PC) or smart phone (PDA device). The glove can also act as a game controller. The Bluetooth circuits replace a USB or similar connector.

Figure 4:
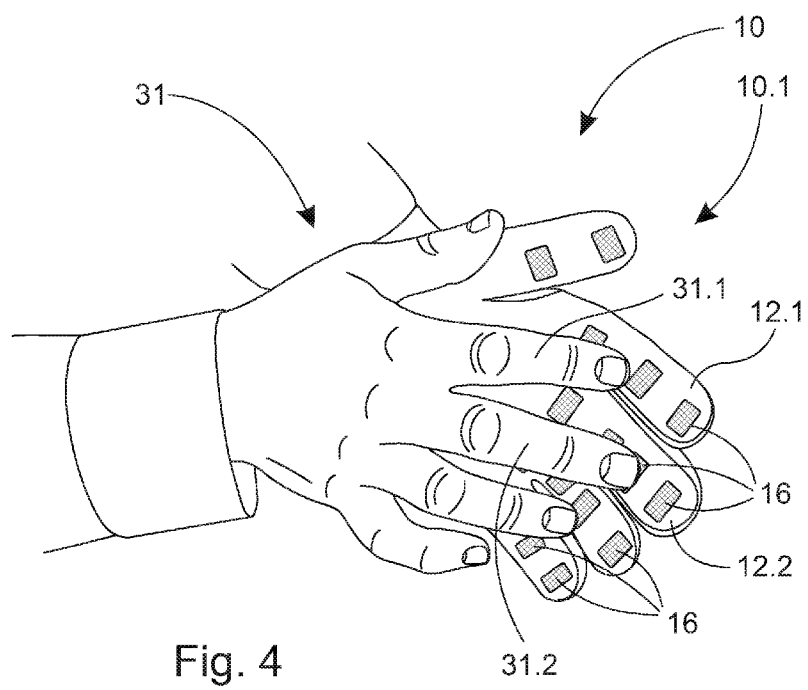
FIG. 4 shows the operation of the glove according to the invention.

According to FIG. 4, operation of the device takes place with the fingers, or at least one finger, of the other hand. According to the figure, in the left hand is a glove 10 with touch sensors 16 according to the invention, as a control device. In the right hand 31, no equipment if necessarily needed, instead operation can take place with the bare fingers. In the figure, the middle finger 31.2 is pressing the note "A".

Figures 5A, 5B:
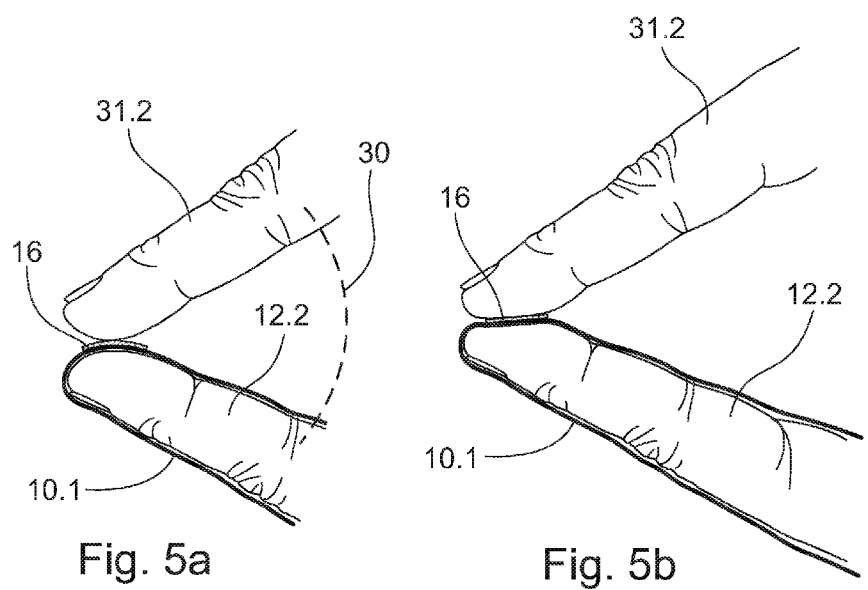
FIGS. 5a and 5b show the playing situation in detail.

FIGS. 5a and 5b illustrate how the active contact surface of the touch sensor 16 depends on the touch pressure. In FIG. 5a, the tip of the middle finger 31.2 of the right hand is just touching the touch sensor 16 on the tip of the middle finger 12.2 of the left hand. In FIG. 5b, the tip of the right middle finger 31.2 is pressing strongly on the touch sensor 16 on the tip of the middle finger 12.2 of the left hand, when the touch surface area and thus the capacitive response are greatest. It is also easy to understand from FIG. 5 that a haptic response is obtained from both fingers.

Another important feature is here easily observed. Stray capacitances are more stable, when playing finger 31.2 is "grounded" through the body 30 of user to the glove hand and supporting finger 12.2 therein.

Alternatively, there can be responses in the fingers of the playing hand, by means of which the touch sensors are operated. For example, galvanic detection can benefit from this, because contact takes place sharply. The operation of such a glove is clumsier, because an electrically conductive material is needed in the fingers of the other hand.

A pedagogical requirement supports the detection of the strength of pushing, because sound volume has a considerable significance in musical expression.

Figure 6:
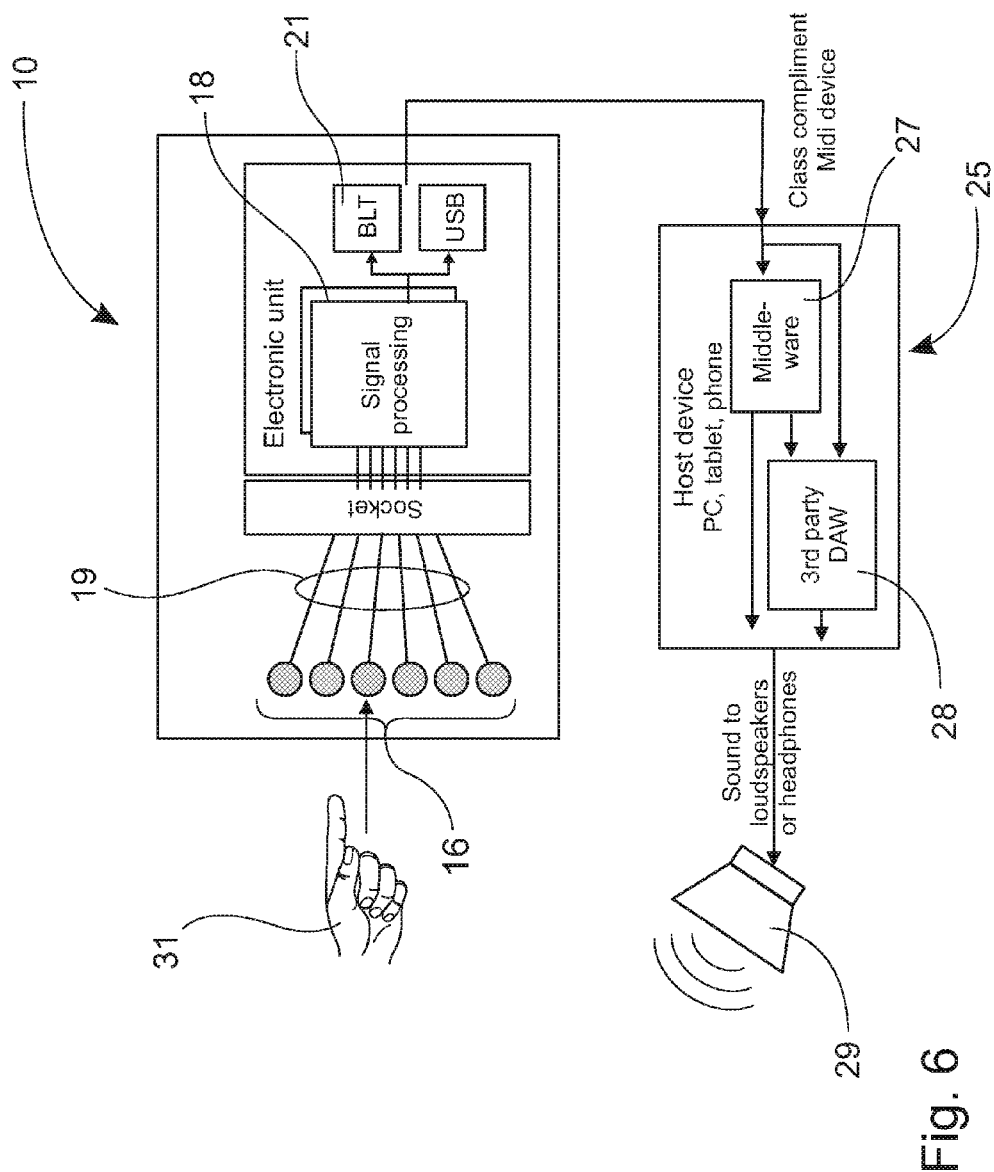
FIG. 6 shows a block diagram of a full system.

The device 10 in a glove is connected to the host device 25, like a PC tablet or a smart phone. The main electronic components of the device in a glove are illustrated in FIG. 6 i.e. electrodes 16, wiring 19, central circuit 18 and I/O-units like Bluetooth®-unit 21 and USB-connection. The host device 25 may produce sound to a loudspeaker 29, when the middleware 27 (software) decodes MIDI-information to sound. Third party software, DAW 28 may be used to export music data to an external device and/or music applications.

The touch event is handled in a comprehensive manner by the glove electronics. The raw data is created from playing sensors just by measuring capacitance. There are plurality of initial settings regarding detection of capacitance, like
- system calibration
- measuring the background cap
- filtering
- baseline definition
- threshold adjust
- touch defection
- measuring the varying cap (due to touch dualities)

The raw data goes to data processing consisting at least:
- data normalization
- touch velocity calculation
- velocity curve definition after touch calculation.
- continuous data curve definition
- conversion to MIDI The touch event is handled electronically by electronic circuits 4, 4' each handling 12 electrodes using multiplexing. There are a lot of stray capacitances e.g. Cp 44 against electrode input and C1 48 from finger to common ground as well as C2 49 between output and common ground. Playing finger 31.2 of other hand 31 is "grounded" through the body 30 of user to the finger 12.2 supporting the electrode 16. A finger induced capacitance is measured in a range of 0.01-30 pf, particularly in a range 0.1-20 pf, where the accuracy is better. A finger has a galvanic contact to each electrode, which has an effect in a measured capacitance and a threshold to be set.

Figure 7:
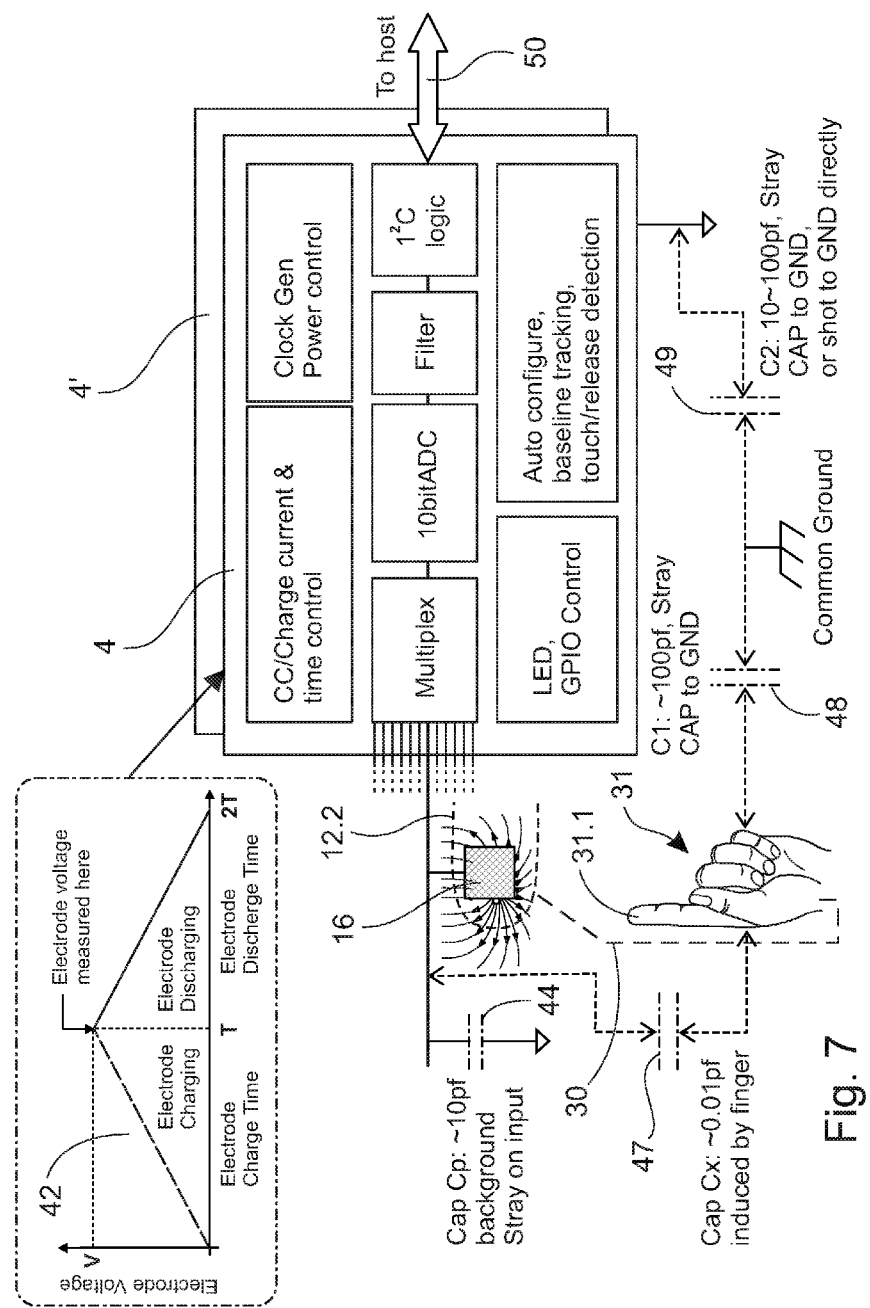
FIG. 7 shows a block diagram of capacitive measurement implemented in the device.

A fingertip of finger 31.1 is inducing a small capacitance 47 in an electrode 16 against the common ground. The MPC121 circuitry 4, 4' detects 12 electrodes through multiplexing. All electrical signals are converted into digital values in a 10 bit analog-digital circuit. After filtering the signal goes $I^2C$-bus logic. That will bring that digital data to the host device as shown by double arrow 50 in FIG. 7.

The circuit uses a constant DC charge current scheme 42 for capacitance measurement. Each channel is charged and then discharged completely to ground periodically to measure the capacitance. All channels are measured periodically sequentially, when one channel is in the charge/discharge and measurement period the other channels are shorted to ground.

The circuit is able to take the measurements up to 1000 hz sample rates. In one embodiment it is used 2 to 8 millisecond sampling interval. Circuitry is adapting to capacitive environment. In one embodiment MPR121 chip (NXP Semiconductors Netherlands B.V.) is used. The chip can follow environment by continuous baseline calibration. See MPR121 specs. Circuitry is able to supply on/off type signal to differentiate touch from noise. Circuitry is able to supply continuous capacitive measurement that portrays the touched area. Capacitive measurement has least 8 bit, preferably 10 bit working range. At least 7 bit of working range is required for musical expressiveness. Working range means the capacitive range from full touch to no touch as a function of area of the touch surface covered by finger. Said embodiment can do 400000 bits of data transfer per second. That corresponds to latency of 1.25 ms for the worst case scenario.

Generally, when the difference X between the measurement result and the zero value at the time t is greater than the threshold value, the signal is interpreted as a contact and if the difference is below the threshold value, the system is in a basic state. The threshold value is freely definable.

A quick change in the measurement result from the zero value means a quick change in the touching surface area. By utilizing this information, it is possible to deduce
a) the time of the beginning of contact, and
b) the contact velocity.

In other words: When x> the threshold value, this is interpreted as the start of the contact. Then Dx/Dt is examined during a time interval by taking into account x before and after the threshold value was exceeded. Dx/Dt represents the velocity of change in the area of contact surface area at the time of contact, i.e. the velocity of contact.

The contact event is assumed to be a short, hit-like event, so in this situation, Dx/Dt is calculated for a time frame of fractions of a second. The contact is considered to have ended when x has risen to the local maximum, i.e. the pressing strength no longer grows. If the information about the contact event is passed forward only after the signal reaches its peak, a delay is generated and it is perceptible to the listener. Therefore, in determining the touch velocity, a standard delay Dt is used, which is measured from the time when the threshold value is exceeded, rather than the full duration of the contact event.

There are many different shapes of the contact surface of the electrodes and the size of the fingers is different with different people. Thus, the change in surface area reaches different maximum, standard and minimum values with different users. In order to normalize the touch signal, a value representing the touch sensitivity is calculated for the result Dx/Dt, the normalized value being N=f(Dx/Dt). The graph of the function is a user-definable floating-point table whose intermediate values are linearly interpolated. The scale of the user's pressing strength is thus normalized and the use of the system becomes user-friendly.

In a typical situation the sensor gives digital values 1-1024 ($=2^{10}$). The back ground capacitance is about 500, the resolution i.e. a difference between weak and strong touch is 350-threshold (20-30). Thus, the resolution is twice as much as in the midi standard requires (0-127).

Above there has been presented a glove having sensors in a fingers and in a certain order. The same pattern with capacitive sensors could be utilized also elsewhere on the hand, where the body is similarly grounding the playing finger. The same technical effect could be achieved even in a different pattern (not part of this invention). The momentary capacitance induced by a finger and thus the strength and speed of the touch is possible measure more accurate, when the stray capacities are limited in a touch event.

What is claimed is:

1. A device for producing musical data, the device comprising a glove equipped with touch sensors, electronic circuitry and a terminal device,
    wherein said touch sensors are placed in at least two rows on the glove in a selected format of a selected musical scale, the selected format corresponding in rows to the order of a 7-note musical scale over a range of at least one octave, being in order from the index finger to the little finger, or the other way around, and the tips of the fingers corresponding to the consecutive notes of the octave C (do), D (re), E (mi), F (fa), with the semitone E-F (mi-fa) locating between the outermost fingers, and where the touch sensors are arranged to be pushed with a finger of the other hand, and wherein electronic circuitry is adapted to convert electrical voltage of each touch sensor to music data, and wherein said terminal device is adapted to output the music data to an external device for utilizing the musical data.

2. The device according to claim 1, wherein the touch sensors are on the side of the palm of the left hand, so that the consecutive notes C (do), D (re), E (mi), and F (fa) are read from left to right.

3. The device according to claim 1, wherein the following notes G (sol), A (la), B (ti), and C (do) are arranged in the second row, the semitone B-C (ti-do) being also located between the ring finger and the little finger.

4. The device according to claim 1, wherein in that the octave's notes A (la) and B (ti) are arranged on the thumb, when the semitone B-C (ti-do) is located between the thumb and the index finger.

5. The device according to claim 1, wherein the touch sensors are capacitive and arranged to detect the strength of a push.

6. The device according to claim 5, wherein finger induced capacitance is measured in a range 0.01-30 pf.

7. The device according to claim 5, wherein at least one touch sensor comprises a conductive material, in which the capacitance according to its touch surface area is arranged to change according to the strength of the push of a fingertip.

8. The device according to claim 5, where in the capacitive touch sensor comprises a piece of fabric surfaced with an electrically conductive material, and a connection conductor connected to it.

9. A system for producing musical data, wherein the system includes a glove according to claim 5 and a selected device, the glove having a wireless transmitter for transmitting touch data to a selected device.

10. An audio device having a system according to claim 9, wherein the audio device includes an amplifier and audio output, including a loudspeaker.

11. A device for producing musical data, the device comprising a garment covering a hand and equipped with capacitive touch sensors, electronic circuitry and a terminal device, wherein said capacitive touch sensors are placed in at least two rows on the garment on the hand in a selected format of a selected musical scale, the selected format corresponding in rows to the order of a 7-note musical scale over a range of at least one octave, being in order from a virtual index finger to a virtual little finger, and virtual tips of the fingers corresponding to the consecutive notes of the octave C (do), D (re), E (mi), F (fa), with the semitone E-F (mi-fa) locating virtually between the outermost fingers, and where the touch sensors are arranged to be pushed with a finger of the other hand, and wherein at least one touch sensor comprises a conductive material, in which the capacitance according to its touch surface area is arranged to change according to the strength of the push of a fingertip, and where the capacitive touch sensor comprises a piece of fabric surfaced with an electrically conductive material, and wherein electronic circuitry is adapted to convert magnitude of capacitance and its change rate of each touch sensor to music data, and wherein said terminal device is adapted to output the music data to an external device for utilizing the musical data.

12. A device according to claim 11, wherein finger induced capacitance is measured in a range 0.01-30 pf.

* * * * *